Patented Jan. 9, 1934

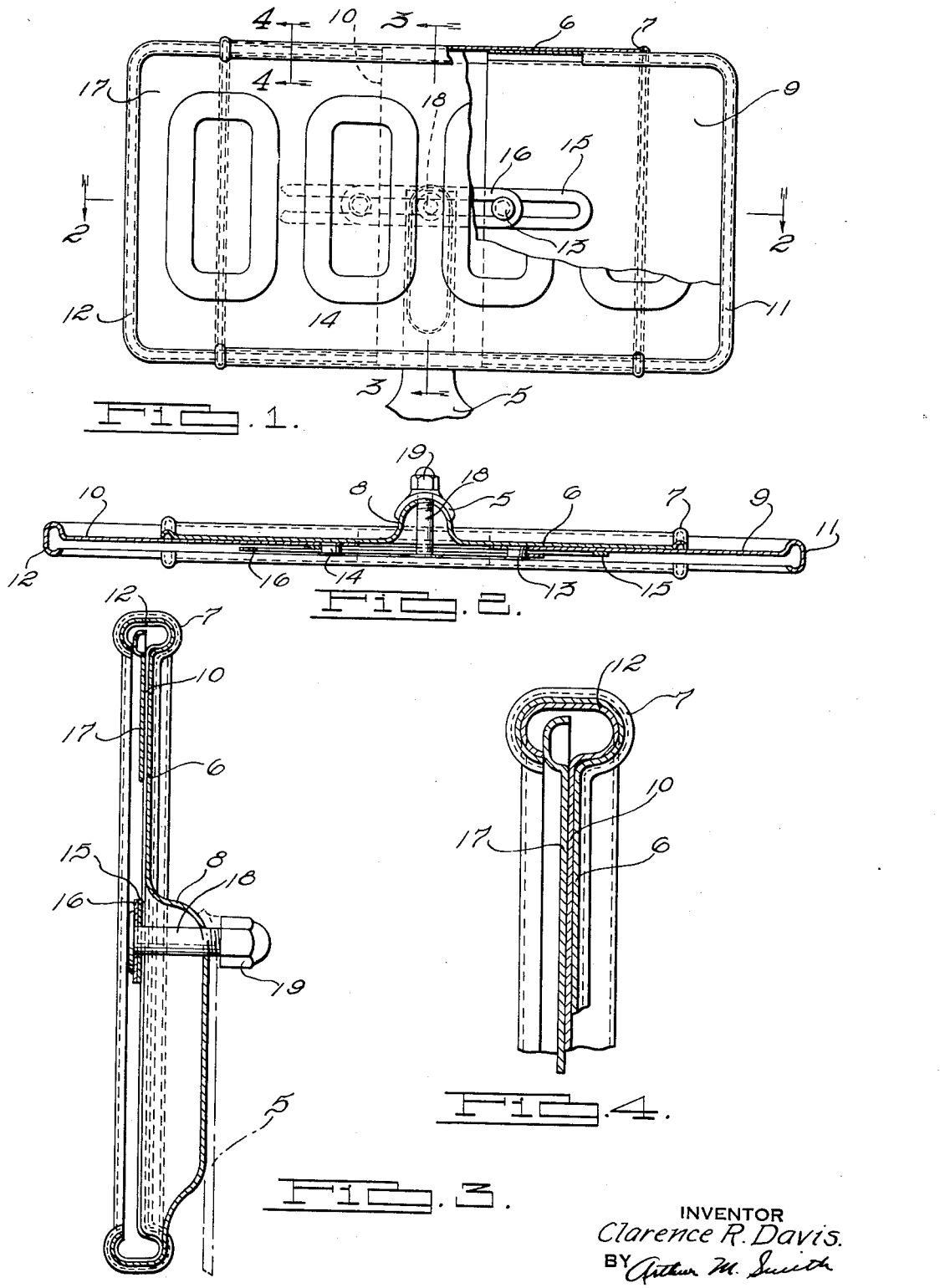

1,943,060

UNITED STATES PATENT OFFICE 1,943,060

AUTOMOBILE LICENSE PLATE HOLDER

Clarence R. Davis, Detroit, Mich., assignor to Davis Tool & Engineering Company, Detroit, Mich., a corporation of Michigan Application February 17, 1932. Serial No. 593,588

8 Claims. (Cl. 40—125)

My invention relates to an automobile license plate holder and particularly to an adjustable holder of this type adapted to accommodate various lengths of automobile license plates to be held therein.

It has been found that the widths of automobile license plates in various States are of a relatively small number of different standard sizes. The lengths of such plates, however, vary a great deal according to the size of the number on the plate. To accommodate this difference in the lengths of such plates it has been found desirable to provide a holder which may easily be adjusted to provide for the varying lengths of the plates without requiring structural changes in the holder itself.

It is, therefore, an object of my present invention to provide an automobile license plate holder which is easily adjustable to provide for different lengths of license plates to be carried therein without requiring structural changes in the holder itself.

It is a further object of my present invention to provide an automobile license plate holder which permits easy changing of the plates to be carried therein and which is easily attached to the license plate bracket carried on the automobile.

These and various other objects, features of arrangement, construction and operation, are plainly shown and described and will be best understood by reference to the accompanying drawing showing a preferred embodiment of my invention, in which Fig. 1 is a plan view of a device embodying my invention with a portion broken away;

Fig. 2 is a sectional view taken on the line 2—2 of Fig. 1;

Fig. 3 is a sectional view taken on the line 3—3 of Fig. 1;

Fig. 4 is a fragmentary sectional view taken on on the line 4—4 of Fig. 1.

Similar reference numerals refer to similar parts throughout the several views.

Referring more in detail to the drawing, 5 designates a bracket which is affixed to the automobile. This bracket may be secured to the automobile in any desired manner and is provided with an opening to permit the securing of a license plate holder thereon. Reference numeral 6 designates a fixed back plate which is formed with an ornamental beaded edge 7 and a rearwardly extending depressed portion 8. The rearwardly extending depressed portion 8 is adapted to conform on its outer surface with the contour of the bracket 5, as shown in Fig. 2.

End plates 9 and 10, having beaded portions 11 and 12, are provided and are so formed that the beaded portions 11 and 12 telescope inside the ornamental beaded portion 7 of the back plate 6. The end members 9 and 10 are provided with rivets 13 and 14 and slotted link members 15 and 16. A license plate 17 contacts with the inside edge of the beaded portions 11 and 12 on the end members 9 and 10, as shown in Fig. 3.

A bolt 18 passes through the back plate 6 and through the slotted portions of the link members 15 and 16 and is of a sufficient length to extend through the bracket 5. A cap nut 19 is adapted for attachment to the screw-threaded end of the bolt 18 and bears against the bracket 5 to hold the entire holder securely against the bracket 5 and to hold the end members 9 and 10 securely against the ends of the license plate carried therein.

The operation of a device embodying my invention is as follows:

When it is desired to insert a license plate 17 in the holder, the end members 9 and 10 are pulled out at each end from the back member 6. The top and bottom edges of the license plate are then slid under the turned beaded portion 7 of the back plate 6, and the end members 9 and 10 are then pushed into contact with the ends of the license plate, the beaded portions 11 and 12 engaging with the edges of the license plate and holding it securely in place.

The bolt 18 passes through the slots in the slotted link members 15 and 16 and then passes through the bracket 5. The nut 19 is then tightened thereon and draws the bolt 18 securely against the links 15 and 16 and serves to hold the end members 9 and 10 tightly against the ends of the license plate 17. The same tightening of the nut 19 also holds the back portion 6 securely against the bracket 5.

While I have illustrated a preferred embodiment of my invention, many modifications may be made without departing from the spirit of the invention, and I do not wish to be limited to the precise details of construction as herein set forth, but desire to avail myself of all changes within the scope of the appended claims.

Having thus described my invention, what I claim is new and desire to secure by Letters Patent of the United States is:

1. An automobile license plate holder including a back plate and telescoping end plates, the said back plate and said end plates being provided with flanged edge portions adapted to engage the edges of a license plate to be carried therein, and a bolt passing through a portion of each of said end members and through said holder and adapted to be secured to a bracket secured to an automobile.

2. An automobile license plate holder including a back plate and telescoping end plates, the said back plate and said end plates being provided with flanged edge portions adapted to engage the edges of a license plate to be carried therein, and means for securing said end members in place and including overlapping extending tongues secured to said end members and a bolt passing through said tongues and said back plate.

3. An automobile license plate holder including a back plate and end plates, the said back plate and said end plates being provided with flanged edge portions adapted to engage the edges of a license plate to be carried therein, and means for securing said end members in place and including extending tongues integral with said end members, and means for holding said tongues in superimposed relation to each other.

4. In an automobile license plate holder including a back plate and telescoping end plates, the said back plate and said end plates being provided with flanged edge portions adapted to engage the edges of a license plate to be carried therein, a slotted tongue carried by each end plate and means maintaining said slotted tongues in superimposed relation to each other, and means for holding said end plates in place and for mounting said license plate holder on an automobile and including a bracket secured to the automobile and a bolt passing through the said slotted tongues, back plate and bracket.

5. An automobile license plate holder including a back plate and telescoping end plates, the said back plate and said end plates being provided with flanged edge portions adapted to engage the edges of a license plate to be held therein, a slotted tongue carried by each end plate, means maintaining said slotted tongues in superimposed relation to each other, and means for securing the said holder to an automobile and including a formed bracket secured to the automobile and a depressed portion on said back plate adapted to be received and held by said formed bracket.

6. An automobile license plate holder including a back plate and end plates, the said back plate and said end plates being provided with flanged edge portions adapted to engage the edges of a license plate to be held therein, a slotted tongue carried by each end plate and adapted to hold said end plates in place and means maintaining said slotted tongues in superimposed relation to each other, and means for securing the said holder to an automobile and including a formed bracket secured to the automobile, a depressed portion on said back plate adapted to be received by said formed bracket, and a bolt passing through said depressed portion and said formed bracket.

7. An automobile license plate holder including a back plate and telescoping end plates, the said back plate and said end plates being provided with flanged edge portions adapted to engage the edges of a license plate to be carried therein, and means for securing the said holder to an automobile and including a bracket having a longitudinal concave portion and adapted to be secured to the automobile, an extended portion on said back plate having a convex outer surface corresponding in size and shape to the longitudinal concave portion of said bracket, and a bolt passing through said back plate and the longitudinal concave portion of said bracket and adapted to secure said license plate holder to the said bracket.

8. An automobile license plate holder including a back plate and telescoping end plates, the said back plate and said end plates being provided with flanged edge portions adapted to engage the edges of a license plate to be carried therein, a slotted tongue carried by each end plate and means maintaining said slotted tongues in slidable superimposed relation to each other, and means for securing the said holder to an automobile and including a bracket having a concave portion extending lengthwise thereof and a portion adapted to be secured to the automobile, an extended portion on said back plate having a convex outer surface corresponding in size and shape to the concavity of said bracket, and means for securing said extended portion of said license plate holder to the concave portion of said bracket.

CLARENCE R. DAVIS.